(12) United States Patent
Stavrowsky et al.

(10) Patent No.: US 10,938,493 B2
(45) Date of Patent: Mar. 2, 2021

(54) VOICE OPERATED ELECTRONIC DEVICE THAT BLOCKS TELEVISION COMMERCIALS AND SUBSTITUTES ALTERNATE CONTENT THEREFOR

(71) Applicants: Luke Gregory Stavrowsky, Cerrillos, NM (US); Devon Stavrowsky, Ignacio, CO (US)

(72) Inventors: Luke Gregory Stavrowsky, Cerrillos, NM (US); Devon Stavrowsky, Ignacio, CO (US)

( * ) Notice: Subject to any disclaimer, the term of this patent is extended or adjusted under 35 U.S.C. 154(b) by 0 days.

(21) Appl. No.: 16/775,440

(22) Filed: Jan. 29, 2020

(65) Prior Publication Data

US 2021/0021356 A1 Jan. 21, 2021

Related U.S. Application Data

(63) Continuation of application No. 16/512,678, filed on Jul. 16, 2019, now Pat. No. 10,594,418.

(51) Int. Cl.
*H04H 20/47* (2008.01)
*H04H 60/37* (2008.01)
*G10L 15/22* (2006.01)
*H04H 40/45* (2008.01)
*H04H 20/40* (2008.01)

(52) U.S. Cl.
CPC ............ *H04H 20/47* (2013.01); *G10L 15/22* (2013.01); *H04H 20/40* (2013.01); *H04H 40/45* (2013.01); *H04H 60/375* (2013.01); *G10L 2015/223* (2013.01); *H04H 2201/13* (2013.01)

(58) Field of Classification Search
None
See application file for complete search history.

(56) References Cited

U.S. PATENT DOCUMENTS

2011/0249073 A1* 10/2011 Cranfill .................. G06F 9/451
348/14.02

FOREIGN PATENT DOCUMENTS

EP 1395047 A2 * 3/2004 ............... H04N 5/45

* cited by examiner

*Primary Examiner* — Noel R Beharry
*Assistant Examiner* — Pamit Kaur
(74) *Attorney, Agent, or Firm* — Dale J. Ream

(57) ABSTRACT

A system and method for blocking normal media content signals, such as television program signals emitted on a visual display of an electronic media device and substituting alternative content for blocked signals includes a control module operable to receive a blocking command via an input device electrically connected to the electronic media device. Receiving a blocking command results in the normal content being blocked and predetermined alternative content is played for either a user specified time or a predetermined time. Control over the television or other media device may be oral via speech recognition technology.

9 Claims, 5 Drawing Sheets

VOICE OPERATED ELECTRONIC DEVICE THAT BLOCKS TELEVISION COMMERCIALS AND SUBSTITUTES ALTERNATE CONTENT THEREFOR

REFERENCE TO RELATED APPLICATIONS

This application claims the priority of non-provisional application Ser. No. 16/512,678 filed Jul. 16, 2019, titled Voice Operated Electronic Device that Blocks Radio Commercials and Substitutes Alternate Audio Content Therefor, which claims the benefit of provisional patent application U.S. Ser. No. 62/698,755 filed Jul. 16, 2018 titled and Voice Operated Electronic Device That Blocks Radio Commercials and Substitutes Alternate Audio Content In Place Of the Blocked Commercials, both of which are incorporated in its entirety herein by reference.

BACKGROUND OF THE INVENTION

This invention relates generally to voice operated electronic devices configured to block radio commercials and, more particularly, to a system and method for people listening to an electronic media device that displays video content, such as videos displayed on the media site known as YouTube™, Netflix™, social media sites, and the like and that allows them to block commercials and substitute alternate video content (alternative video) during this blocked period.

A vast majority of videos, movies, and even television programming is obtained using electronic devices connected to the internet. Alternately, video programming is obtained via satellite dish or cable connection using so-called smart devices that are equipped for interaction with the media source, such as by pressing appropriate buttons on a remote control or by voice command. A frequent complaint by listeners of television programs, whether television, online videos, talk radio, or music radio, is that they become mildly or even severely annoyed by what is seen as wasted time on commercials. Many listeners are even so bothered by the content or amount of time spent on commercials that they are willing to pay extra money to eliminate advertisements altogether. This has become common with online streaming video services. However, listeners of traditional radio and television programs have so far not been presented with a viable solution to stop commercials or to do so entirely by hands-free voice commands.

Various video programming is known for providing two broadcast streams—one shown on a full television screen and another in a smaller insert screen. Such programming may require a user to have two tuners to display both programs. While the existing proposals are presumably effective for their intended purposes, there is still a need for an improved system for blocking commercials in video programming and, selectively, displaying alternate and predetermined content in place of the intended commercial and, preferably, to do so upon receiving a voice command to block the advertisement and to do so until the intended commercial has finished.

Therefore, it would be desirable to have a system and method for blocking video commercials and for replacing blocked content with other video media content for a quantity of time specified by the listener or, if not indicated, for a predetermined amount of time. Further, it would be desirable to have a system and method for blocking and substituting that works entirely by detecting predetermined voice commands of a user and actuating the blocking and substituting accordingly.

SUMMARY OF THE INVENTION

A system and method for blocking video commercials and for replacing blocked video content with other media content according to the present invention includes a system having a voice operated electronic device that blocks video commercials upon detecting a predetermined voice command and a spoken or predetermined quantity of time and substitutes alternate content in place of the blocked commercials. In some embodiments, the present system eliminates the need for video watchers to have to listen to commercials during live or recorded broadcasts of programming.

Therefore, a general object of this invention is to provide a system and method for blocking broadcast media content and substituting alternative content for a user-defined or predetermined amount of time using an input device or voice activated commands.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
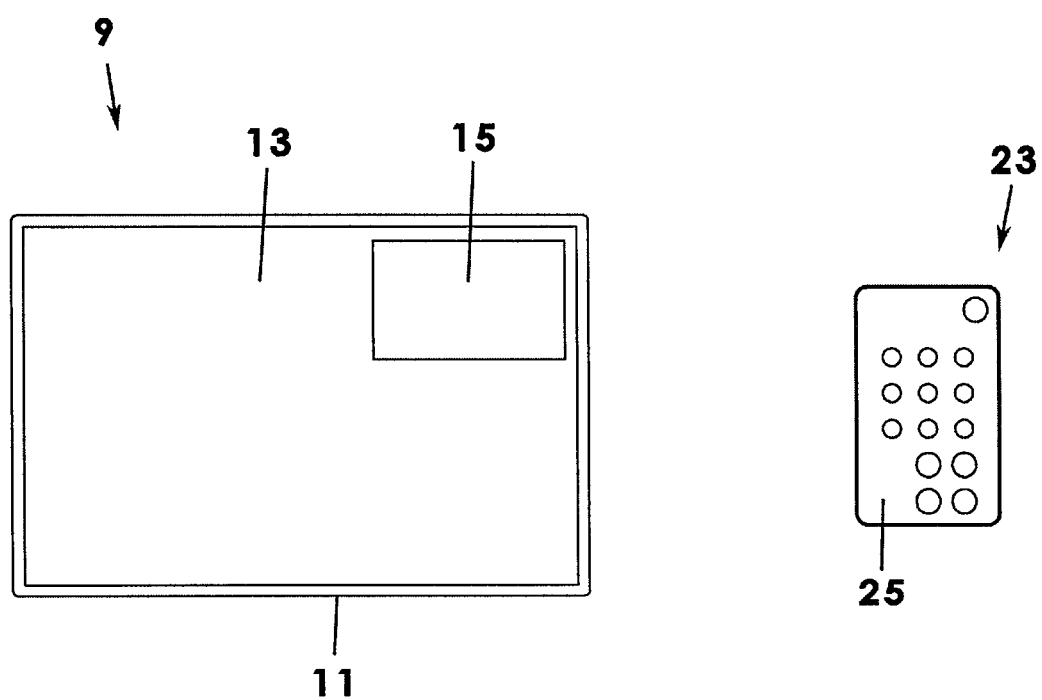
FIG. 1 is a plan view diagram illustrating a system and method for blocking content signals in use with a smart television system according to a preferred embodiment of the present invention.
Figure 2:
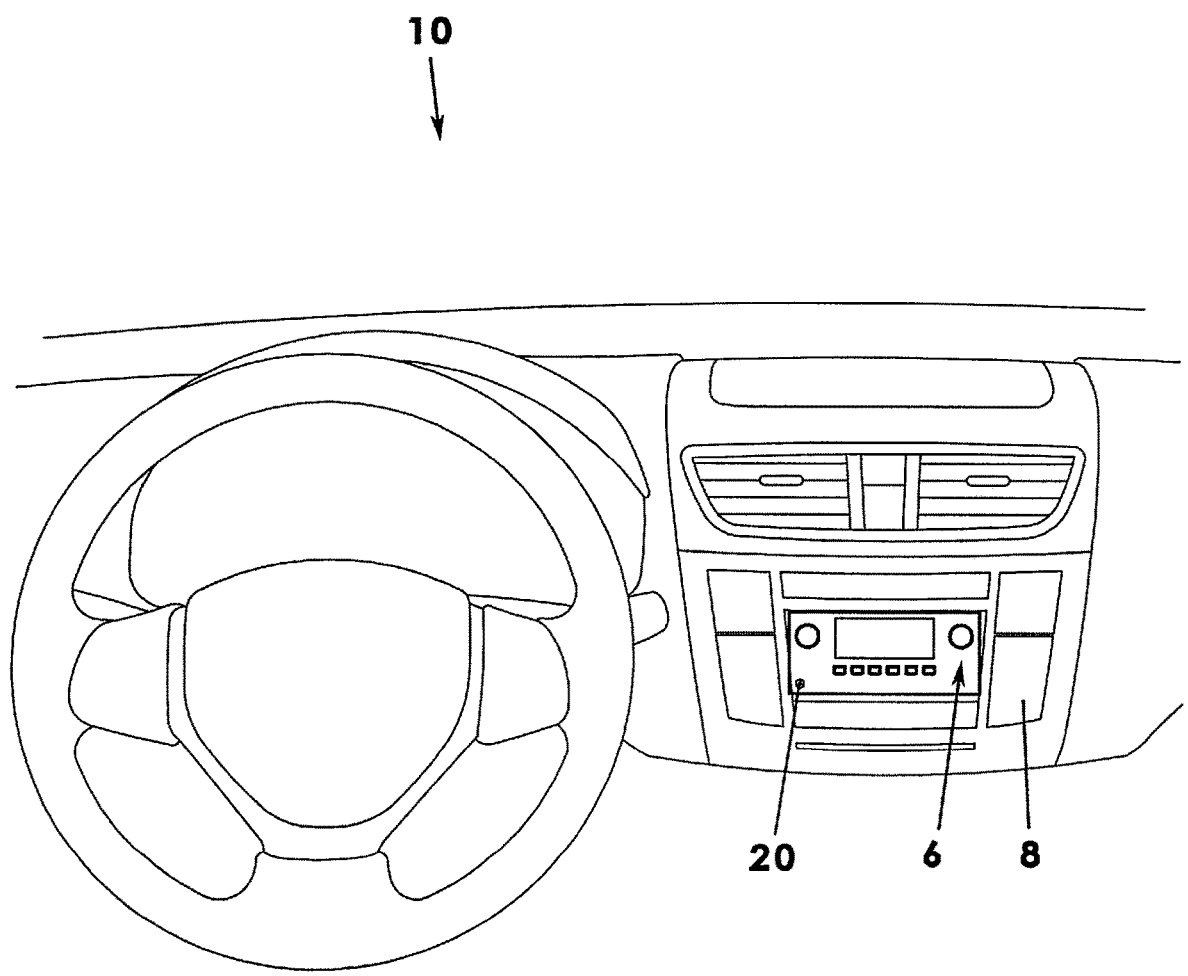
FIG. 2 is a plan view diagram illustrating a system and for blocking content signals installed for use with an automobile radio system according to a preferred embodiment of the present invention.

A system and method for blocking broadcast media content and substituting alternative content for a user-defined or predetermined amount of time using voice activated commands will now be described in detail with reference to FIGS. 1 to 5 of the accompanying drawings. The system 10 and method according to the present invention includes an electronic media device 6 such as a radio or television that receives media signals for direction to a speaker 8, a control module 21 which in some embodiments may be a voice control module 22, an input device 23 which in some embodiments may be a microphone 20 and in other embodiments a handheld remote control 17, and software that facilitates the invention as will be described in detail below. It will be understood that although television, such as may be installed in an residence, is used throughout the present disclosure, television is merely exemplary and the media device 6 may alternatively be satellite radio, streaming audio or video signals via the internet, cable television, or other sources of audio or video content having signals that may be blocked, replaced, or otherwise affected by the invention described below. It is also understood that one of ordinary skill in the art of radio and television manufacturers will understand the electronic components needed to implement such systems for receiving respective media signals and directing them to visual displays, speaker systems, storage systems, and the like.

With reference to FIG. 1, the present invention will be described using the example of cooperating or integration with a television 11 that receives content signals through a cable, satellite, or antenna. Modern televisions are typically operated using a remote control having input buttons for raising or lowering volume, selecting a channel displaying desired content, and for other specialty functions. For the sake of clarity, the remote control or other means for user interaction with a television will be referred to as an input device 23 that is configured to collect and transmit input commands or input data. The collection of input data may be manual, e.g. collected by pressing buttons, or may be collected audibly and using speech recognition software. For example, the input device 23 may include a microphone 20 that collects voice commands from a user, e.g. commands for simply changing volume or channels and, in the present invention, collecting blocking commands as will be described in detail below.

In the simplest embodiment of the present invention, the system 10 includes a control module 21 in data communication with the electronic media device 6 (e.g. a television) and, specifically, with the input device 23. The control module 21, which may include discrete electronics or programming in software, is configured to determine if an input command collected by the input device 23 is indicative of a user desire to block the current content signals being received and displayed on the visual display of the electronic media device 6, e.g. content being displayed on the set TV channel. If, in fact, the input command includes a blocking command, the control module 21 is configured to block the incoming content signals and to replace the blocked content signals with replacement data as will be described further below.

In an embodiment, the control module 21 may include a voice control module 22 that is specifically configured or programmed to receive audible input commands from the input device 23. It will be understood that although the remainder of the description may refer to input commands received audibly and processed by the voice control module 22 (and a voice controlled system is preferred), the principle of collecting input commands manually or electronically from the input device 23 will be understood by the same description.

More particularly, the system 10 may include a microphone 20 installed on the input device 23, electrically or wirelessly connected to the television itself, or at a location proximate to the television or to the user. In other words, the microphone 20 is positioned where it may receive voice commands from a user. When the system 10 is activated, the microphone 20 continuously "listens" to audible commands from persons speaking proximate to the microphone 20. The microphone 20 is in data communication with a control module, i.e. with electronic elements programmed and capable of receiving and processing human speech. For instance, a voice control module 22 is an assembly of electronics or computer software capable of speech recognition. Speech recognition software is most often recognized in the context of a user speaking into a microphone, such as via a headset, and then having that speech translated into a word processor document. Speech recognition is also used in mobile phones that enables a user to compose an email or text message without having to type or press buttons. Other smart devices listen for predetermined voice commands and then search the internet for a suitable answer to a spoken request or question. However, speech recognition is not usually associated with blocking a television commercial and substituting alternative content for the blocked content.

The microphone 20 may be in data communication with the voice control module 22 so as to transmit a voice command to the voice control module 22 for interpretation and, if appropriate, to take action. Again, the present description also applies to input commands received via buttons on an input device 23. More particularly, the voice control module 22 may itself be a microprocessor having electronics sufficient to evaluate incoming sounds (or input data) and looking for a predetermined command or may simply be electrically connected to a microprocessor (referred to simply as a processor 24), and may include a combination or assembly of electronic components. Even more particularly, the processor 24 may be in data communication with a non-volatile memory 26 having a plurality of storage location operable to store data and programming instructions, the processor 24 being capable of actuating other components according to the programming instructions (i.e. software). A power source 28, such as a battery, may be electrically connected to the processor 24 and, therefore, indirectly electrically connected to other electric and electronic components.

Predetermined words to be recognized and which are associated with certain actions may be programmed into memory 26 at the point of manufacture or by the user during a setup routine before use. For example, a user may assign a unique name to the radio, television, or other device to be controlled. The software would then be initiated when it detects and understands the predetermine word. For instance, the user may say something like "hijacker block 4" and the voice control module 22 would recognize this code word as a blocking command to then be acted on as described below.

The voice control module 22 or processor 24 in general is intended to be installed, at the factory or by a third party technician. A television, or other media device, may include a controller or similar electronics for receiving media contact signals and directing received content signals to a visual display 9 (e.g. of a television 11 or visual display 9) or to speaker 8 for publication, (e.g. a car speaker playing a radio program). More particularly, the television or media device may include a satellite dish or cable TV box (not shown) for receiving content signals according to a channel to which the television tuner is tuned, e.g. a football game on channel 140 of Dish™ network or the like. More particularly, television stations may be selected by channels associated with respective frequencies, with incoming signals arriving by cable, internet, or satellite platforms. In any case, the present system 10 is electrically connected—by wire or by integration—to the media device 6 and, under software control, is capable of stopping incoming or received content signals from being delivered to the visual display 9 or speaker 8 and, as will be described later, being replaced with alternative content stored in memory 26.

In another aspect, alternative or replacement content may be stored in memory 26, such as at the point of manufacturing or, in some embodiment, uploaded by a user from a mobile device, phone, iPod, computer, USB port, flash drive, or the like. For instance, the replacement data may include a self-help message, a spiritual message, a podcast, an educational program, a foreign language tutorial, music, or just silence. Preferably, the alternative content is the same length and duration of a 60 second or two minute block typical of a commercial break. In other words, the alternative or replacement content is intended to last the precise length of a commercial break so that the user does not miss out on any of the television or radio programming for which he has tuned in.

In a critical aspect, a user is able to block commercials, or any segment of a media program for that matter, for a user-determined or predetermined amount of time. Preferably, a user is able to speak (or select) a period of time immediately following speaking (or selecting) the predetermined code word indicating a desire to block received media signals. For example, speaking "Hijacker Block 4" could be interpreted as initiating the blocking of received content signals for the next 4 minutes on the media device associated with the name "hijacker" and then unblocking said received content signals to the speaker 8 or displayed on the visual display 9. According to programming, if no time parameter for blocking received signals is given, the system 10 may be programmed to supply a predetermined amount of time, say 30 seconds, 60 seconds, 2 minutes, or the like. Simultaneously with recognizing the spoken word associated with blocking, the processor 24 may actuate the memory 26 and controller associated with the electronic media device 6 to send and receive the alternative or replacement content data, respectively. In an embodiment, the substitute content may be directed directly from a USB port (i.e. to which a thumb drive is inserted) to the electronic media device. This may be accomplished through channel switching, i.e. changing the address of an input device. The received signals are blocked and the replacement content is substituted so long as a blocking timer has not expired.

Figure 3:
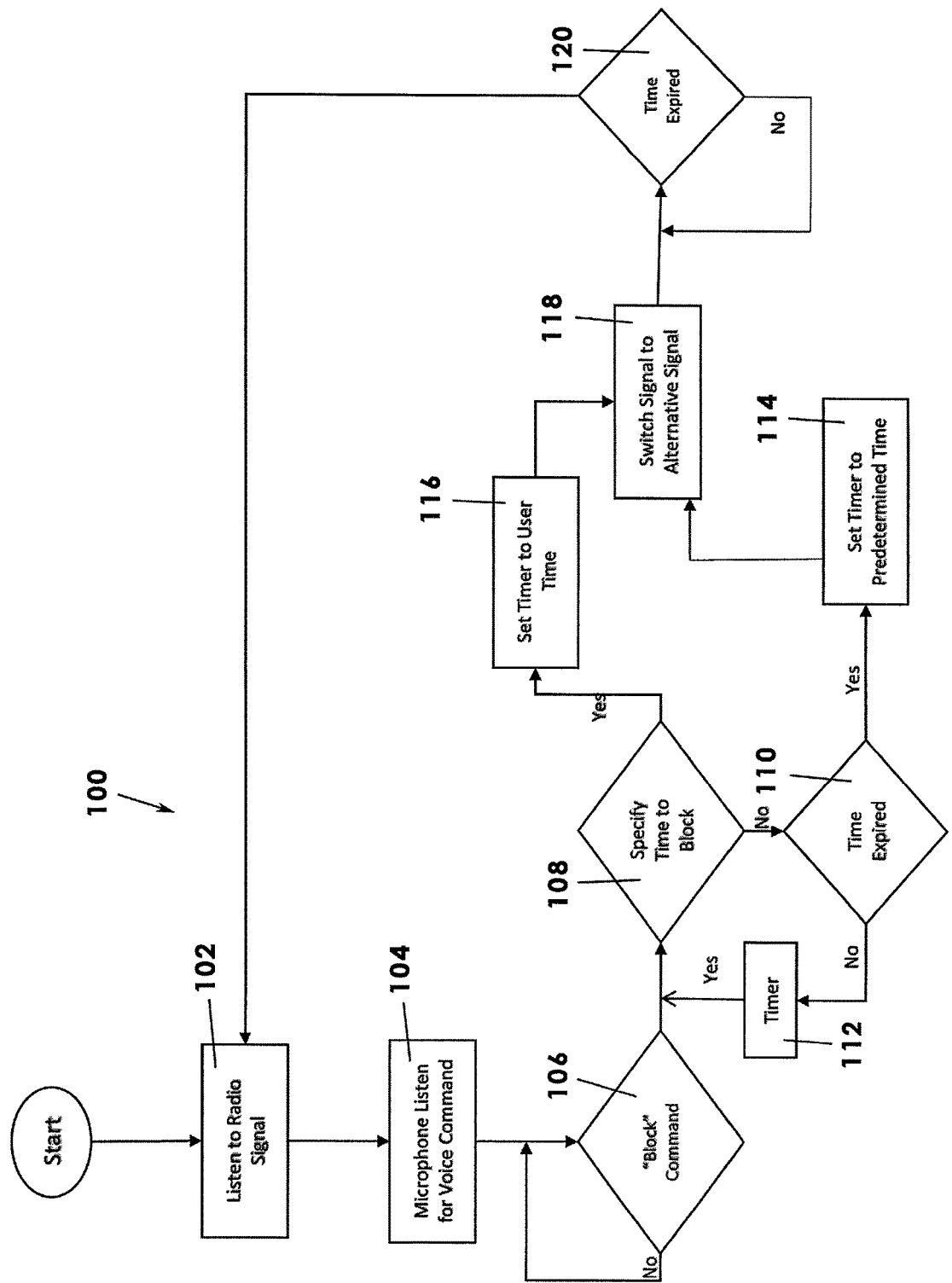
FIG. 3 is a flowchart illustrating the method for blocking media content and substituting alternative media content to replace the blocked content signals, illustrated in the context of radio and television or video signals.
Figure 4:
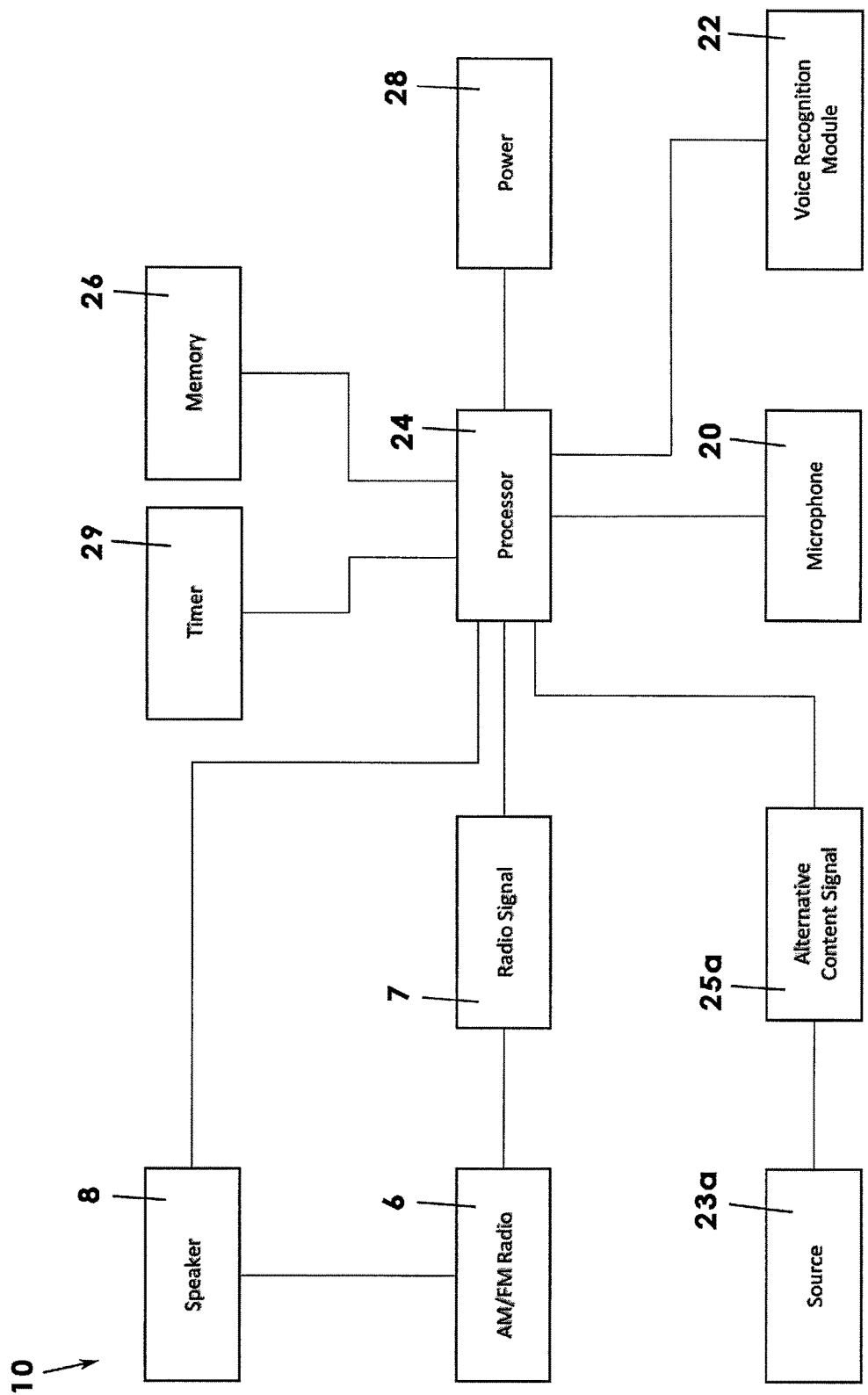
FIG. 4 is a block diagram illustrating the electrical and electronic components of the system according to the present invention, illustrating use for radio signals.

A process 100 (FIG. 3) illustrates the method for blocking and substituting media content signals according to the present invention and will now be described. It is understood that references to radio or radio signals may be understood to also apply to television or television signals For instance, the reference to listening to a radio signal in block 102 will be understood to apply to listening to a television signal (FIG. 3). More particularly, block 102 represents the media device 6 (e.g. a radio or television) receiving media content signals 7 and playing them via a speaker 8 or visual display 9. This is a normal state of the invention when the system 10 is powered on. As described above, this could represent radio, television, Internet streaming, or other media delivery platforms). The process 100 then proceeds to block 104 which represents that the microphone 20 is activated and is "listening" for a voice command. The process 100 proceeds to step 106, at which the processor 24 (or, the voice control module 22 in data communication with the processor 24) determines if a "block" command has been received by the microphone 20 and, if so, the process 100 proceeds to step 108. Otherwise, the process 100 loops to step 106 until a blocking command is received. Alternately, the block command may be received via the input device 23 and control module 21.

Then, at step 108, the processor 24 determines if the user has also spoken or entered a quantity of time (called a user timer command) over which the media signals are to be blocked and, if so, proceeds to step 116; otherwise the process 100 proceeds to step 110. At step 110, the processor 24 determines if a time has expired for the user to say the user timer command and, if that tinier has expired, then the process 100 proceeds to step 114; otherwise the process 100 proceeds to step 112. At step 112, the timer 29 is either actuated or continues to run and the process 100 loops back to step 108 at which a user still has opportunity to speak the user timer command.

Figure 5:
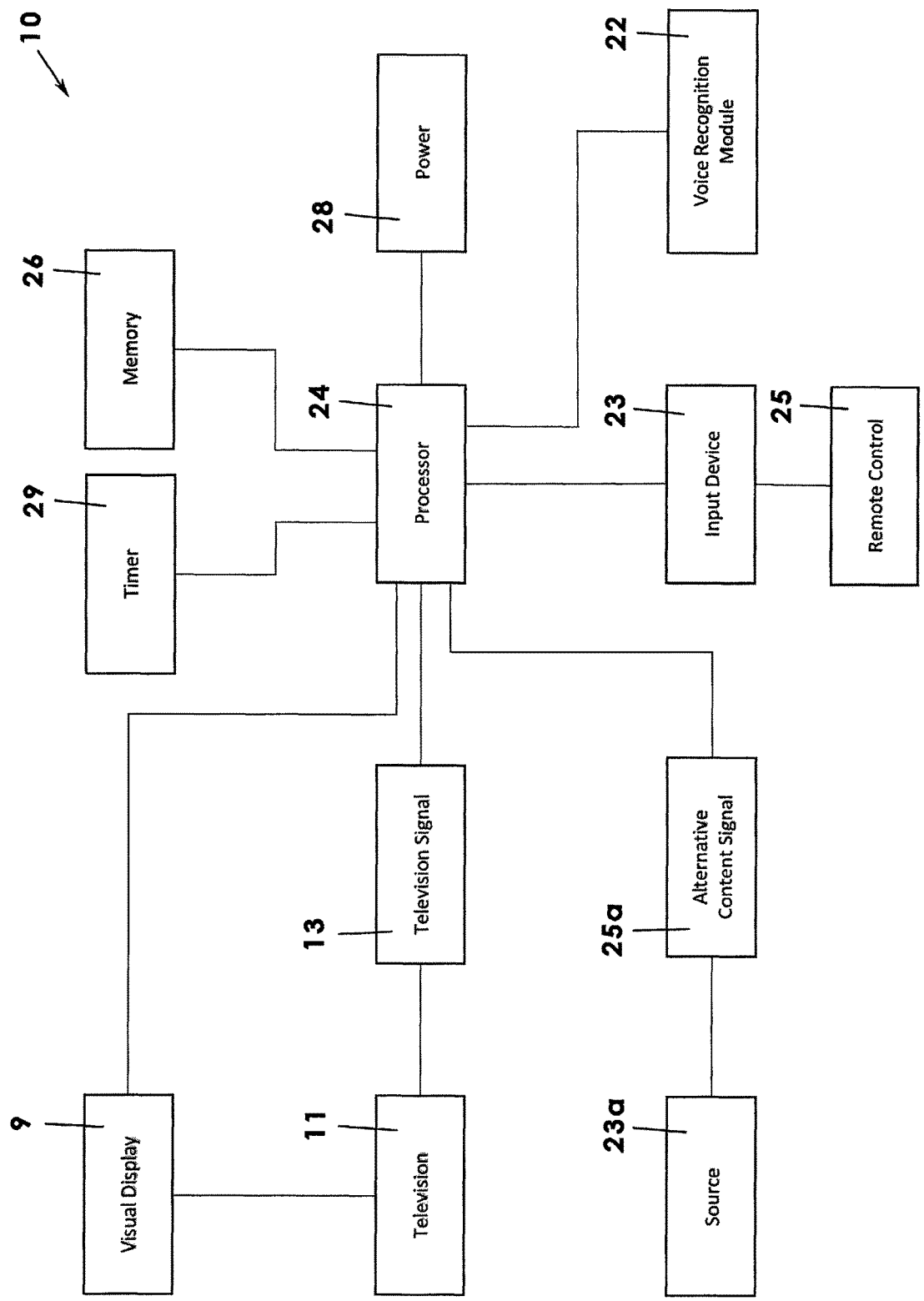
FIG. 5 is a block diagram illustrating the electrical and electronic components of the system according to the present invention, illustrating use with television and video signals.

At step 114 (when no user timer command was given before the input timer expired), the blocking timer is set to a predetermined amount of time, such as two minutes or the like, By contrast, at step 116, the blocking timer is set to a time equivalent to the user's voice command regarding time. For instance, if the user's command is "hijacker block 4, the blocking timer is set to 4 minutes and actuated to count down. After either step 114 or 116, the content signal is switched at step 118 to direct the substitute content to the speaker 8 or visual display 9 as described above. The alternative content signals are referred to with reference numeral 25a with the source of the signal referenced by 23a (FIG. 5). The process 100 proceeds to step 120 at which the processor 24 determines if the blocking timer has expired and, if so, the process 100 proceeds to step 102 and, essentially, starts over, i.e. the received content signals are unblocked and allowed to be directed to the visual display 9 or speaker 8. In other words, the substitute content was played so long as the received content signals were played and the blocking timer was unexpired after which time the received content signals, e.g. radio program, began playing again.

Not referring to the flowchart, the method of use can be explained as follows. The present system that blocks television commercials and substitutes alternate audio-visual content in place of the blocked commercials of the present disclosure, a person may use simple voice commands to operate, whereby the end user identifies the commercial stream, gets the voice operated electronic device's attention (by calling its name), gives a command (out of pre-programmed command set) to block, gives a time period to block, and the system then carries out commands, performing all steps automatically from there on out. In this way, the end user can choose to listen to the commercials he/she prefers to hear, block all of them, or simply block a portion of the commercials. In embodiments utilizing audible inputs, no physical motions (turning dials, pushing buttons, etc.) would be required to perform the tasks of the system and method. The end result is that people listening to radio programming can end the irritating problem of listening to commercials over and over again during the live broadcasting of AM/FM radio programming.

The system and method for blocking media content signals is also configured and operable to block content in a television operating in a picture-in-a-picture (PIP) environment. In other words, the visual display 9 may include a first display screen 13 showing primary content (i.e. the main or scheduled program) that is positioned in a primary or prominent position on a visual display 9 and a second display screen 15 showing secondary content (i.e. a second program) that is positioned adjacent to or even completely or partially behind or in a muted background position on the visual display 9. The user is given control to select if he wants to watch the primary program being shown in the first display screen 13 or to mute the content therein, put the first display screen 13 in the background, and activate the second display screen 15 to the more prominent configuration and actuate its audio and video signal.

Now, in the context of the present invention, the stream of content signals associated with the primary program may be received and displayed in the first display screen 13. But, then, if an input command associated with a blocking command is received by the control module 21 (or, by the voice control module 22 in the context of a speech recognition embodiment), the control module 21 is configured or programmed to block incoming content signals by moving the first display screen 13 to a muted background position. In other words, the primary program signals may be blocked by muting and moving the primary display screen to the background and moving a second display screen 15 into the foreground for displaying alternative content for a predetermined period of time according to the method described above. It is understood that the control module 21 is in electrical communication with the electronic media device 6, e.g. a smart television, for receiving input commands and for actuating respective display screens as explained above. Specifically, content signals may be blocked in a PIP environment by muting and moving a primary window into a muted background position and moving a second display screen displaying alternative content into the foreground position on the visual display 9.

It is understood that content other than commercials may be blocked upon receiving the blocking command. For instance, if a program being viewed by a user is deemed to be offensive, undesirable, boring, or irrelevant, the user can activate a blocking command for a period of time in the same or substantially the same manner as described above.

It is contemplated that the invention disclosed and recited in the present application will apply to blocking incoming media signals to virtually any media device. Although specific examples and hardware particular to receiving and publishing received media signals in the context of radio and television, the invention is not limited thereto. In other words, new media devices are being developed and refined in the areas of virtual reality (VR) and augmented reality (AR) to which the present invention may also apply. More particularly, virtual reality refers to an artificial environment presented to a user on an electronic device, such as a computer or video headset, that generally presents a so-called reality experience using only two senses—sight and sound. Virtual reality is often an experience in the form of video game, headsets, or stand-alone electronic devices. VR may include simulators for training and gaming systems in which a mouse, keyboard keystrokes or a hand controller are manipulated as input devices. Taking VR a step further, some devices introduce a third sense—namely the sense of touch, e.g. "haptics" such as vibration or the like. A three-sensory device may include a golf club device actually held by a user as the input device and in conjunction with a video display screen and in which the golf club may have weight distribution and vibration sensory components in addition to sight and sound sensations. More recently, augmented reality (AR) technology may superimpose a digital or graphical image over an actual physical video signal. For example, television networks superimpose a yellow yardage marker on a video stream of a football game. Similarly, text or graphics may be likewise superimposed on television content.

In either instance, the VR or AR device includes a speaker or a visual display (or both) connected to a processor and having appropriate controllers operable to publish audible and visual content signals on an electronic media device such as a radio, television, computer visual display, or the like. As such, the principles disclosed in the present application and its progeny regarding blocking and alternative content apply to VR and AR platforms as well.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. It is understood that while certain forms of this invention have been illustrated and described, it is not limited thereto except insofar as such limitations are included in the following claims and allowable functional equivalents thereof.

We claim:

1. A system for blocking and substituting content on an electronic media device that receives content signals and that has a controller for delivering the received content signals to a visual display, said content blocking and substituting system comprising:
    an input device connected to the electronic media device and operable to receive input commands;
    a control module in data communication with said input device and with the electronic media device, said control module being configured to:
        display a current content signal on a first display screen in a foreground position on the visual display;
        determine if a respective received input command received via said input device is a predetermined blocking command indicative of a user's desire to block said current content signal and, if so,
        block said current content signal received by the visual display by actuating the controller of the electronic media device to stop delivering the received content signals to the visual display by moving said first display screen to a muted background position on the visual display, and
        display an alternative content signal in a second display screen displayed in said foreground position on the visual display;
    a processor; and
    a nonvolatile memory in data communication with said processor and having storage locations for storing replacement content data and programming instructions;
    wherein said processor is in data communication with said control module, said input device, and with the electronic media device;
    wherein said control module is configured to:
        determine if said predetermined blocking command includes a user timer command and, if so, to actuate a blocking timer for a time equivalent to said user timer command;
        determine if said predetermined blocking command does not include a user timer command and, if not, actuate said blocking timer for a time equivalent to a predetermined time;
        unblock said current content signal when said blocking timer expires;
        determine if said predetermined blocking command includes a user timer command and, if not, to actuate an input timer for a predetermined time, whereby giving opportunity for a user to actuate said user timer command;
        determine if said input timer has expired and, if not, repeat the step of determining if said predetermined blocking command does not include a user timer command;
        to continue actuating the controller of the electronic media device to continue blocking the received media content signals to the visual display until said blocking timer has expired;

wherein said memory includes replacement content data associated with said alternative content signal and said control module is configured to:

actuate the controller of the electronic media device to mute the first display screen and to move said first display screen to said muted background position if said blocking command is received and so long as said blocking timer has not expired;

actuate the processor to deliver said replacement content data to the second display screen if said blocking command is detected and said blocking timer has not expired.

2. The content blocking and substituting system as in claim 1, further comprising a microphone in data communication with said processor;

wherein said control module is a voice control module, said voice control module being programmed to:

determine if a human voice command is received by said microphone and if said received human voice command is a predetermined blocking command indicative of a user's desire to block the current content signal;

block said current content signal being received by the electronic media device if said blocking command is received;

streaming said replacement content data to the visual display so tong as said current content signal is blocked.

3. The content blocking and substituting system as in claim 1, further comprising a microphone in data communication with said control module;

wherein said control module is a voice control module, said voice control module being programmed to:

determine if a human voice command is received by said microphone and if said received human voice command is a predetermined blocking command indicative of a user's desire to block the current content signal;

block said current content signal being received by the electronic media device if said blocking command is received;

streaming said replacement content data to the visual display so long as said current content signal is blocked.

4. The content blocking and substituting system as in claim 3, wherein said voice control module is programmed to allow the media content signals to be received by the electronic media device and directed thereby to the visual display when said blocking timer has expired.

5. The content blocking and substituting system as in claim 4, wherein said control module is configured to continue actuating the controller of the electronic media device to continue blocking the received media content signals to the visual display until said blocking timer has expired.

6. A system for blocking and substituting content an electronic media device that receives content signals and that has a controller for delivering the received content signals to a visual display, said content blocking and substituting system comprising:

an input device electrically connected to the electronic media device and operable to receive input commands;

a processor in electronic communication with the input device of the electronic media device;

a nonvolatile memory in data communication with said processor and having a plurality of storage locations for storing replacement content data and programming instructions;

a control module in data communication with said processor and operable to allow or prevent the received content signals to be delivered to the visual display, said control module being programmed to:

determine if a respective input command is a predetermined blocking command indicative of a user's desire to block the current content signal and, if so, block a current content signal being received by the electronic media device;

streaming said replacement content data to the visual display so long as said current content signal is blocked;

determine if said predetermined blocking command includes a user timer command and, if so, to actuate a blocking timer for a time equivalent to said user timer command;

determine if said predetermined blocking command does not include a user timer command and, if not, to actuate said blocking timer for a time equivalent to a predetermined time;

unblock said current content signal when said blocking timer expires;

determine if said predetermined blocking command includes a user timer command and, if not, to actuate an input timer for a predetermined time;

determine if said input timer has expired and, if not, repeat the step of determining if said predetermined blocking command does not include a user timer command;

actuate the controller of the electronic media device to cease delivering the received media content signals to the visual display if said blocking command is received and so long as said blocking timer has not expired;

actuate the controller of said electronic media device to receive said replacement content data and deliver said received content data to the visual display if said blocking command is detected and said blocking timer has not expired;

wherein said voice control module, according to said programming instructions, is configured to continue actuating the controller of the electronic media device to cease sending the received media content signals to the visual display until said blocking timer has expired.

7. The content blocking and substituting system as in claim 6, further comprising a microphone in data communication with said processor;

wherein said control module is a voice control module, said voice control module being programmed to:

determine if a human voice command is received by said microphone and if said received human voice command is a predetermined blocking command indicative of a user's desire to block the current content signal and, if so, block said current content signal being received by the electronic media device;

streaming said replacement content data to the visual display so long as said current content signal is blocked.

8. The content blocking and substituting system as in claim 7, wherein said voice control module is programmed to allow the media content signals to be received by the electronic media device and directed thereby to the visual display when said blocking timer has expired.

9. The content blocking and substituting system as in claim 8, wherein said control module is configured to continue actuating the controller of the electronic media device to continue blocking the received media content signals to the visual display until said blocking timer has expired.

* * * * *